United States Patent [19]
Kaneko et al.

[11] Patent Number: 5,801,132
[45] Date of Patent: Sep. 1, 1998

[54] REFRIGERATOR OIL COMPOSITION

[75] Inventors: Masato Kaneko; Tsuneo Konishi; Katsumi Ichitani, all of Ichihara, Japan

[73] Assignee: Idemitsu Kosan Co., Ltd., Tokyo, Japan

[21] Appl. No.: 844,673

[22] Filed: Apr. 21, 1997

[51] Int. Cl.[6] .......................... C10M 145/24; C09K 5/00
[52] U.S. Cl. .................... 508/579; 508/462; 508/496; 508/589; 252/67; 252/68
[58] Field of Search ............................... 508/579; 252/68

[56] References Cited

U.S. PATENT DOCUMENTS

| | | | |
|---|---|---|---|
| 3,878,112 | 4/1975 | Luck et al. | 252/68 |
| 4,755,316 | 7/1988 | Magid et al. | 252/68 |
| 4,851,144 | 7/1989 | McGraw et al. | 252/68 |
| 4,948,525 | 8/1990 | Sasaki et al. | 508/579 |
| 5,002,678 | 3/1991 | Vanover et al. | 252/68 |
| 5,080,816 | 1/1992 | Sakamoto et al. | 508/582 |
| 5,114,605 | 5/1992 | Mizui et al. | 252/68 |
| 5,254,280 | 10/1993 | Thomas et al. | 252/68 |
| 5,368,765 | 11/1994 | Kaneko | 508/579 |
| 5,370,809 | 12/1994 | Ishida et al. | 252/68 |
| 5,384,056 | 1/1995 | Tanaka et al. | 252/68 |
| 5,543,068 | 8/1996 | Kaimai et al. | 252/68 |
| 5,656,578 | 8/1997 | Tanaka et al. | 252/68 |

FOREIGN PATENT DOCUMENTS

| | | |
|---|---|---|
| 0 507 158 | 10/1992 | European Pat. Off. . |
| 2 388 227 | 11/1978 | France . |

OTHER PUBLICATIONS

Patent Abstracts of Japan, vol. 17, No. 185 (C–1047), Apr. 12, 1993, JP 04–337391, Nov. 25, 1992.
Database WPI, Derwent Publications, AN 86–242514, JP 61–171799, Aug. 2, 1986.

*Primary Examiner*—Ellen M. McAvoy
*Attorney, Agent, or Firm*—Oblon, Spivak, McClelland, Maier & Neustadt, P.C.

[57] ABSTRACT

Disclosed is a refrigerator oil composition comprising at least one base oil selected from mineral oils and synthetic oils, and at least one polyether compound having a kinematic viscosity of from 200 to 10000 $mm^2$/sec at 100° C. The composition has an excellent lubricating property, while specifically improving the lubricity of bearings. This is effective for preventing bearings from being seized and fatigued, and is suitable as a lubricating oil in refrigerators using hydrogen-containing Flon refrigerants, such as R134a, that do not cause environmental pollution.

9 Claims, No Drawings

REFRIGERATOR OIL COMPOSITION

TECHNICAL FIELD

The present invention relates to a refrigerator oil composition. More particular, it relates to a refrigerator oil composition which has an excellent lubricating property of specifically improving the lubricity of bearings to thereby prevent them from being seized or worn, and which is suitable as a lubricating oil- for refrigerators using hydrogen-containing Flon refrigerants such as 1,1,1,2-tetrafluoroethane (R134a) that do not bring about environmental pollution.

BACKGROUND ART

In general, a compressor-type refrigerator comprises a compressor, a condenser, an expansion valve and an evaporator, and a mixed liquid comprising a refrigerant and a lubricating oil is circulated in the closed system of the refrigerator. In the compressor-type refrigerator of that type, in general, dichlorodifluoromethane (R12), chlorodifluoromethane (R22) and the like have heretofore been used as refrigerants and various mineral oils and synthetic oils as lubricating oils.

However, since chlorofluorocarbons such as R12 mentioned above will bring about environmental pollution, as destroying the ozone layer existing in the stratosphere, their use is being severely controlled in all the world. Given the situation, new refrigerants, hydrogen-containing Flon compounds such as hydrofluorocarbons and hydrochlorofluorocarbons have become specifically noted. Since such hydrogen-containing Flon compounds, for example, hydrofluorocarbons such as typically R134a will not destroy the ozone layer and can be substituted for R12 and the like without almost changing or modifying the structure of conventional refrigerators, they are favorable as refrigerants for compressor-type refrigerators.

The properties of thes new Flon-substituent refrigerants are different from those of the conventional Flon refrigerants; and it is known that refrigerator oils capable of being used along with these may comprise a base oil component selected from, for example, polyalkylene glycols, polyesters, polyol esters, polycarbonates and polyvinyl ethers having particular structures, and various additives to be added to said base oil component, such as antioxidants, extreme pressure agents, defoaming agents and hydrolysis inhibitors.

However, these known refrigerator oils are problematic in practical use in that, when used in the atmosphere comprising any of the above-mentioned refrigerants, their lubricating properties are poor and, in particular, they cause increased fatigue and baking of bearings in the refrigerating parts in car air-conditioners and electric refrigerators.

On the other hand, various additives are known that may be useful for solving the problems. At present, however, no means is known capable of effectively protecting bearings from being fatigued or seized in particular conditions in such a Flon atmosphere without interfering with the stability of bearings.

DISCLOSURE OF THE INVENTION

The present invention has been made herein in consideration of the above-mentioned viewpoints, and its object is to provide a refrigerator oil composition which has an excellent lubricating property of specifically improving the lubricity of bearings, while protecting them from being seized and fatigued, and which is suitable as a lubricating oil for refrigerators using hydrogen-containing Flon refrigerants such as R134a that do not bring about environmental pollution.

We, the present inventors have assiduously studied and, as a result, have found that the above-mentioned object of the invention can be effectively attained by incorporating a polyether compound having a kinematic viscosity of from 200 to 10000 mm$^2$/sec at 100° C., into a base oil comprising any of mineral oils and synthetic oils. On the basis of this finding, the inventors have completed the present invention.

Specifically, the present invention provides a refrigerator oil composition comprising at least one base oil selected from mineral oils and synthetic oils, and at least one polyether compound having a kinematic viscosity of from 200 to 10000 mm$^2$/sec at 100° C.

BEST MODES OF CARRYING OUT THE INVENTION

The refrigerator oil composition of the present invention comprises, as the base oil, at least one selected from mineral oils and synthetic oils. The mineral oils and synthetic oils for use in the present invention are not specifically defined, but any of those generally used as the base oil for ordinary refrigerator oils may be employed herein. However, preferred herein are base oils having a kinematic viscosity at 100° C. of from 1 to 100 mm$^2$/sec, more preferably from 2 to 60 mm$^2$/sec, even more preferably from 3 to 40 mm$^2$/sec. Though not specifically defined, the pour point of the base oil for use herein, which may be an index of the low-temperature fluidity of the oil, is desirably -10° C. or lower.

Various mineral oils and synthetic oils are known, from which are selected any desired ones depending on their use. As mineral oils, for example, mentioned are paraffinic mineral oils, naphthenic mineral oils, and intermediate base mineral oils. As synthetic oils, for example, mentioned are oxygen-containing organic compounds and hydrocarbon-type synthetic oils.

The oxygen-containing organic compounds of synthetic oils may include those having any of ether groups, ketone groups, ester groups, carbonate groups and hydroxyl groups in the molecule, and those additionally having hetero atoms (e.g., sulfur, phosphorus, fluorine, chlorine, silicon, nitrogen) in addition to such groups. Concretely, the compounds may include ① polyalkylene glycols, ② polyvinyl ethers, ③ polyesters, ④ polyol esters, ⑤ carbonate derivatives, ⑥ polyether ketones, and ⑦ fluorinated oils.

The polyalkylene glycols ① may include, for example, compounds of a general formula (I):

$$R^1\text{-}[(OR^2)_m\text{-}OR^3]_n \qquad (I)$$

wherein R$^1$ represents a hydrogen atom, an alkyl group having from 1 to 10 carbon atoms, an acyl group having from 2 to 10 carbon atoms, or an aliphatic hydrocarbon group having from 1 to 10 carbon atoms and having from 2 to 6 bonding sites; R$^2$ represents an alkylene group having from 2 to 4 carbon atoms; R$^3$ represents a hydrogen atom, an alkyl group having from 1 to 10 carbon atoms, or an acyl group having from 2 to 10 carbon atoms; n represents an integer of from 1 to 6; and m represents a number of giving an average of m×n of being from 6 to 80.

In formula (I), the alkyl group for R$^1$ and R$^3$ may be linear, branched or cyclic. Specific examples of the alkyl group may include a methyl group, an ethyl group, an n-propyl group, an isopropyl group, various butyl groups, various pentyl groups, various hexyl groups, various heptyl groups, various octyl groups, various nonyl groups, various decyl groups, a cyclopentyl group, and a cyclohexyl group. If the alkyl group has more than 10 carbon atoms, the miscibility of the oil with Flon refrigerants is lowered, often resulting in phase separation therebetween. Preferably, the alkyl group has from 1 to 6 carbon atoms.

The alkyl moiety in the acyl group for $R^1$ and $R^3$ may also be linear, branched or cyclic. As specific examples of the alkyl moiety of the acyl group, referred to are those having from 1 to 9 carbon atoms of the alkyl group mentioned hereinabove. If the acyl group has more than 10 carbon atoms, the miscibility of the oil with Flon refrigerants is lowered, often resulting in phase separation therebetween. Preferably, the acyl group has from 2 to 6 carbon atoms.

Where both $R^1$ and $R^3$ are alkyl groups or acyl groups, they may be the same or different.

Where n is 2 or more, the plural $R^3$s in one molecule may be the same or different.

Where $R^1$ is an aliphatic hydrocarbon group having from 1 to 10 carbon atoms and having from 2 to 6 bonding sites, the aliphatic hydrocarbon group may be linear, branched or cyclic. The aliphatic hydrocarbon group having 2 bonding sites may include, for example, an ethylene group, a propylene group, a butylene group, a pentylene group, a hexylene group, a heptylene group, an octylene group, a nonylene group, a decylene group, a cyclopentylene group, and a cyclohexylene group. The aliphatic hydrocarbon group having from 3 to 6 bonding sites may include residues to be derived from polyalcohols, such as trimethylolpropane, glycerin, pentaerythritol, sorbitol, 1,2,3-trihydroxycyclohexane and 1,3,5-trihydroxycyclohexane, by removing the hydroxyl groups from them.

If the aliphatic hydrocarbon group has more than 10 carbon atoms, the miscibility of the oil with Flon refrigerants is lowered, often resulting in phase separation therebetween. Preferably, the group has from 2 to 6 carbon atoms.

In formula (I), $R^2$ is an alkylene group having from 2 to 4 carbon atoms. The repeating unit of the oxyalkylene group therein may include, for example, an oxyethylene group, an oxypropylene group, and an oxybutylene group. The oxyalkylene groups in one molecule may be the same, or one molecule may have 2 or more different oxyalkylene groups. Preferably, however, one molecule comprises at least oxypropylene units. More preferably, oxypropylene units account for 50 mol% or more of all oxyalkylene units in one molecule.

In formula (I), n is an integer of from 1 to 6, and is determined depending on the number of the bonding sites of $R^1$. For example, when $R^1$ is an alkyl group or an acyl group, then n is 1; and when $R^1$ is an aliphatic hydrocarbon group having 2, 3, 4, 5 or 6 bonding sites, then n is 2, 3, 4, 5 or 6, respectively. In formula (I), m is a number of giving an average of m×n of being from 6 to 80. If the average of m×n falls outside the defined scope, the object of the present invention could not be attained satisfactorily.

The polyalkylene glycol of formula (I) includes hydroxyl-terminated polyalkylene glycols. Any such hydroxyl-terminated polyalkylene glycol may be suitably used in the present invention, so far as its terminal hydroxyl content is not larger than 50 mol% of all the terminal groups. If its terminal hydroxyl content is larger than 50 mol%, the polyalkylene glycol is too much hygroscopic, thereby often having a lowered viscosity index.

Of the polyalkylene glycols of formula (I), preferred are polyoxypropylene glycol dimethyl ether, polyoxyethylene polyoxypropylene glycol dimethyl ether and polyoxypropylene glycol monobutyl ether, as well as polyoxypropylene glycol diacetate, in view of their economic aspects and their effects.

For the polyalkylene glycols, of formula (I), all of those described in detail in Japanese Patent Application Laid-Open No. 2-305893 are employable in the present invention.

The polyvinyl ether ② may include, for example, polyvinyl ether compounds (1) comprising constitutive units of a general formula (II):

wherein $R^4$ to $R^6$ each represent a hydrogen atom, or a hydrocarbon group having from 1 to 8 carbon atoms, and these may be the same or different; $R^7$ represents a divalent hydrocarbon group having from 1 to 10 carbon atoms, or a divalent, ether bond oxygen-containing hydrocarbon group having from 2 to 20 carbon atoms; $R^8$ represents a hydrocarbon group having from 1 to 20 carbon atoms; a represents a number of from 0 to 10 in terms of its average; $R^4$ to $R^8$ may be the same or different in different constitutive units; and plural $R^7$Os, if any, may be the same or different.

The polyvinyl ether ② may further include polyvinyl ether compounds (2) of block or random copolymers comprising constitutive units of the above-mentioned formula (II) and constitutive units of the following general formula (III):

wherein $R^9$ to $R^{12}$ each represent a hydrogen atom, or a hydrocarbon group having from 1 to 20 carbon atoms, and these may be the same or different; and $R^9$ to $R^{12}$ may be the same or different in different constitutive units.

In formula (II), $R^4$ to $R^6$ each are a hydrogen atom, or a hydrocarbon group having from 1 to 8 carbon atoms, preferably from 1 to 4 carbon atoms. The hydrocarbon group may include, for example, alkyl groups such as a methyl group, an ethyl group, an n-propyl group, an isopropyl group, various butyl groups, various pentyl groups, various hexyl groups, various heptyl groups, and various octyl groups; cycloalkyl groups such as a cyclopentyl group, a cyclohexyl group, various methylcyclohexyl groups, various ethylcyclohexyl groups, and various dimethylcyclohexyl groups; aryl groups such as a phenyl group, various methylphenyl groups, various ethylphenyl groups, and various dimethylphenyl groups; and arylalkyl groups such as a benzyl group, various phenylethyl groups, and various methylbenzyl groups. $R^4$ to $R^6$ are especially preferably hydrogen atoms.

In formula (II), $R^7$ is a divalent hydrocarbon group having from 1 to 10 carbon atoms, preferably from 2 to 10 carbon atoms, or is a divalent, ether bond oxygen-containing hydrocarbon group having from 2 to 20 carbon atoms. The divalent hydrocarbon group having from 1 to 10 carbon atoms may include, for example, divalent aliphatic groups, such as a methylene group, an ethylene group, a phenylethylene group, a 1,2-propylene group, a 2-phenyl-1,2-propylene group, a 1,3-propylene group, various butylene groups, various pentylene groups, various hexylene groups, various heptylene groups, various octylene groups, various nonylene groups, and various decylene groups; alicyclic groups having two bonding sites to be derived from alicyclic hydrocarbons, such as cyclohexane, methylcyclohexane, ethylcyclohexane, dimethylcyclohexane and propylcyclohexane; divalent aromatic hydrocarbons such as various phenylene groups, various methylphenylene groups, various ethylphenylene groups, various dimethylphenylene groups, and various naphthylene groups; alkyl aromatic groups as derived from alkylaromatic hydrocarbons, such as toluene and ethylbenzene, and having a mono-valent bonding site in both the alkyl moiety and the aromatic moiety; and alkylaromatic groups as derived from polyalkylaromatic hydrocarbons, such as xylene and diethylbenzene, and having bonding sites in the alkyl moieties. Of these, especially preferred are aliphatic groups having from 2 to 4 carbon atoms.

Preferred examples of the divalent, ether bond oxygen-containing hydrocarbon group having from 2 to 20 carbon atoms are a methoxymethylene group, a methoxyethylene group, a methoxymethylethylene group, a 1,1-bismethoxymethylethylene group, a 1,2-bismethoxymethylethylene group, an ethoxymethylethylene group, a (2-methoxyethoxy)methylethylene group, and a (1-methyl-2-methoxy)methylethylene group. In formula (II), a indicates the number of repeating units of $R^7O$, and is from 0 to 10, preferably from 0 to 5, in terms of its average. Plural $R^7Os$, if any, in formula (II) may be the same or different.

In formula (II), $R^8$ is a hydrocarbon group having from 1 to 20 carbon atoms, preferably from 1 to 10 carbon atoms. The hydrocarbon group may include, for example, alkyl groups such as a methyl group, an ethyl group, an n-propyl group, an isopropyl group, various butyl groups, various pentyl groups, various hexyl groups, various heptyl groups, various octyl groups, various nonyl groups, and various decyl groups; cycloalkyl groups such as a cyclopentyl group, a cyclohexyl group, various methylcyclohexyl groups, various ethylcyclohexyl groups, various propylcyclohexyl groups, and various dimethylcyclohexyl groups; aryl groups such as a phenyl group, various methylphenyl groups, various ethylphenyl groups, various dimethylphenyl groups, various propylphenyl groups, various trimethylphenyl groups, various butylphenyl groups, and various naphthyl groups; and arylalkyl groups such as a benzyl group, various phenylethyl groups, various methylbenzyl groups, various phenylpropyl groups, and various phenylbutyl groups.

The polyvinyl ether compound (1) comprising the repeating unit of formula (II) is preferably such that the molar ratio of carbon/oxygen therein falls between 4.2 and 7.0. If said molar ratio is less than 4.2, the hygroscopicity of the compound will be too high. If, on the other hand, it is more than 7.0, the miscibility with Flon of the compound will be poor.

In formula (III), $R^9$ to $R^{12}$ each are a hydrogen atom, or a hydrocarbon group having from 1 to 20 carbon atoms, and these may be the same or different. As examples of the hydrocarbon group having from 1 to 20 carbon atoms, referred to are those mentioned hereinabove for $R^8$ in formula (II). $R^9$ to $R^{12}$ may be the same or different in different constitutive units in formula (III).

The polyvinyl ether compound (2) of a block or random copolymer comprising both the constitutive units of formula (II) and the constitutive units of formula (III) is also preferably such that the molar ratio of carbon/oxygen therein falls between 4.2 and 7.0. If said molar ratio is less than 4.2, the hygroscopicity of the compound will be too high. If, on the other hand, it is more than 7.0, the miscibility with Flon of the compound will be poor.

Mixtures of the above-mentioned polyvinyl ether compound (1) and the above-mentioned polyvinyl ether compound (2) are also employable in the present invention.

These polyvinyl ether compounds (1) and (2) for use in the present invention can be produced through polymerization of the corresponding vinyl ether monomers, and through copolymerization of the corresponding olefinic double bond-having hydrocarbon monomers and the corresponding vinyl ether monomers, respectively.

Of the polyvinyl ether compounds, preferably used herein are those having the following terminal structure, or that is, having a structure of which one terminal is represented by the following general formula (IV) or (V):

wherein $R^{13}$ to $R^{15}$ each represent a hydrogen atom, or a hydrocarbon group having from 1 to 8 carbon atoms, and these may be the same or different; $R^{18}$ to $R^{21}$ each represent a hydrogen atom, or a hydrocarbon group having from 1 to 20 carbon atoms, and these may be the same or different; $R^{16}$ represents a divalent hydrocarbon group having from 1 to 10 carbon atoms, or a divalent, ether bond oxygen-containing hydrocarbon group having from 2 to 20 carbon atoms; $R^{17}$ represents a hydrocarbon group having from 1 to 20 carbon atoms; b represents a number of from 0 to 10 in terms of its average; and plural $R^{16}Os$, if any, may be the same or different, while the other terminal is represented by the following general formula (VI) or (VII):

wherein $R^{22}$ to $R^{24}$ each represent a hydrogen atom, or a hydrocarbon group having from 1 to 8 carbon atoms, and these may be the same or different; $R^{27}$ to $R^{30}$ each represent a hydrogen atom, or a hydrocarbon group having from 1 to 20 carbon atoms, and these may be the same or different; $R^{25}$ represents a divalent hydrocarbon group having from 1 to 10 carbon atoms, or a divalent, ether bond oxygen-containing hydrocarbon group having from 2 to 20 carbon atoms; $R^{26}$ represents a hydrocarbon group having from 1 to 20 carbon atoms; c represents a number of from 0 to 10 in terms of its average; and plural $R^{25}Os$, f any, may be the same or different;

and those having a structure of which one terminal is represented by the above-mentioned general formula (IV) or (VI) while the other terminal is represented by the following general formula (VIII):

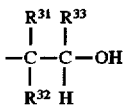

(VIII)

wherein $R^{31}$ to $R^{33}$ each represent a hydrogen atom, or a hydrocarbon group having from 1 to 8 carbon atoms, and these may be the same or different. Of these polyvinyl ether compounds, those mentioned below are especially preferred as the base oil constituting the refrigerator oil composition of the present invention.

(1) Polyvinyl ether compounds of which one terminal is represented by formula (IV) or (V) while the other terminal is represented by formula (VI) or (VII), and in which $R^4$ to $R^6$ in the constitutive units of formula (II) are all hydrogen atoms, a is a number of from 0 to 4, $R^7$ is a divalent hydrocarbon group having from 2 to 4 carbon atoms, and $R^8$ is a hydrocarbon group having from 1 to 20 carbon atoms.

(2) Polyvinyl ether compounds comprising only the constitutive units of formula (II), of which one terminal is represented by formula (IV) while the other terminal is represented by formula (VI) and in which $R^4$ to $R^6$ in the constitutive units of formula (II) are all hydrogen atoms, a is a number of from 0 to 4, $R^7$ is a divalent hydrocarbon group having from 2 to 4 carbon atoms, and $R^8$ is a hydrocarbon group having from 1 to 20 carbon atoms.

(3) Polyvinyl ether compounds of which one terminal is represented by formula (IV) or (V) while the other terminal is represented by formula (VIII), and in which $R^4$ to $R^6$ in the constitutive units of formula (II) are all hydrogen atoms, a is a number of from 0 to 4, $R^7$ is a divalent hydrocarbon group having from 2 to 4 carbon atoms, and $R^8$ is a hydrocarbon group having from 1 to 20 carbon atoms.

(4) Polyvinyl ether compounds comprising only the constitutive units of formula (II), of which one terminal is represented by formula (IV) while the other terminal is represented by formula (VII) and in which $R^4$ to $R^6$ in the constitutive units of formula (II) are all hydrogen atoms, a is a number of from 0 to 4, $R^7$ is a divalent hydrocarbon group having from 2 to 4 carbon atoms, and $R^8$ is a hydrocarbon group having from 1 to 20 carbon atoms.

In addition, also employable in the present invention are polyvinyl ether compounds comprising the constitutive units of formula (II), of which one terminal is represented by formula (IV) while the other terminal is represented by the following general formula (IX):

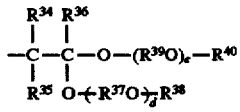

(IX)

wherein $R^{34}$ to $R^{36}$ each represent a hydrogen atom, or a hydrocarbon group having from 1 to 8 carbon atoms, and these may be the same or different; $R^{37}$ to $R^{39}$ each represent a divalent hydrocarbon group having from 2 to 10 carbon atoms, and these may be the same or different; $R^{38}$ to $R^{40}$ each represent a hydrocarbon group having from 1 to 10 carbon atoms, and these may be the same or different; d and e each represent a number of from 0 to 10 in terms of their mean value, and these may be the same or different; plural $R^{37}$Os, if any, may be the same or different; and plural $R^{39}$Os, if any, may be the same or different.

Further employable in the present invention are polyvinyl ether compounds of being homopolymers or copolymers of alkyl vinyl ethers, which comprise constitutive units of the following general formula (X) or (XI):

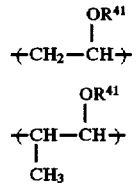

(X)

(XI)

wherein $R^{41}$ represents a hydrocarbon group having from 1 to 8 carbon atoms,
which have a weight-average molecular weight of from 300 to 3000, preferably from 300 to 2000, and of which one terminal is represented by the following general formula (XII) or (XIII):

(XII)

$-CH=CHOR^{43}$ (XIII)

wherein $R^{42}$ represents an alkyl group having from 1 to 3 carbon atoms; and $R^{43}$ represents a hydrocarbon group having from 1 to 8 carbon atoms. The polyvinyl ethers mentioned hereinabove are described in detail in Japanese Patent Application Laid-Open Nos. 6-128578, 6-234814, 6-234815, and 8-193196, and all of those described therein are employable in the present invention.

The polyester ③ may include, for example, aliphatic polyester derivatives comprising constitutive units of the following general formula (XIV) and having a molecular weight of from 300 to 2000:

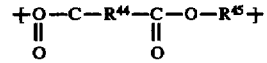

(XIV)

wherein $R^{44}$ represents an alkylene group having from 1 to 10 carbon atoms; and $R^{45}$ represents an alkylene group having from 2 to 10 carbon atoms, or an oxaalkylene group having from 4 to 20 carbon atoms.

In formula (XIV), $R^{44}$ is an alkylene group having from 1 to 10 carbon atoms, which may include, for example, a methylene group, an ethylene group, a propylene group, an ethylmethylene group, a 1,1-dimethylethylene group, a 1,2-dimethylethylene group, an n-butylethylene group, an isobutylethylene group, a 1-ethyl-2-methylethylene group, a 1-ethyl-1-methylethylene group, a trimethylene group, a tetramethylene group, and a pentamethylene group. This is preferably an alkylene group having 6 or less carbon atoms. $R^{45}$ is an alkylene group having from 2 to 10 carbon atoms, or an oxaalkylene group having from 4 to 20 carbon atoms. The alkylene group may include those of $R^{44}$ referred to hereinabove (excepting a methylene group), but is preferably an alkylene group having from 2 to 6 carbon atoms. The oxaalkylene group may include, for example, a 3-oxa-1,5-pentylene group, a 3,6-dioxa-1,8-octylene group, a 3,6,9-trioxa-1,11-undecylene group, a 3-oxa-1,4-dimethyl-1,5-pentylene group, a 3,6-dioxa-1,4,7-trimethyl-1,8-octylene group, a 3,6,9-trioxa-1,4,7,10-tetramethyl-1,11-undecylene group, a 3-oxa-1,4-diethyl-1,5-pentylene group, a 3,6-dioxa-1,4,7-triethyl-1,8-octylene group, a 3,6,9-trioxa-1,4,7,10-tetraethyl-1,11-undecylene group, a 3-oxa-1,1,4,4-tetramethyl-1,5-pentylene group, a 3,6-dioxa-1,1,4,4,7,7-hexamethyl-1,8-octylene group, a 3,6,9-trioxa-1,1,4,4,7,7,10,10-octamethyl-1,11-undecylene group, a 3-oxa-1,2,4,5-tetramethyl-1,5-pentylene group, a 3, 6-dioxa-1,2,4,5,7,8-hexamehtyl-1,8-octylene group, a 3,6,9-trioxa-1,2,4,5,7,8, 10,11-octamethyl-1,11-undecylene group, a 3-oxa-1-methyl-1,5-pentylene group, a 3-oxa-1-ethyl-1,5-pentylene group, a 3-oxa-1,2-dimethyl-1,5-pentylene group, a 3-oxa-1-methyl-4-ethyl-1,5-pentylene group, a 4-oxa-2,2,6,6-tetramethyl-1,7-heptylene group, and a 4,8-dioxa-2,2,6,6,10,10-hexamethyl-1,11-undecylene group. $R^{44}$ and $R^{55}$ may be the same or different in different constitutive units.

It is desirable that the aliphatic polyester derivatives of formula (XIV) have a molecular weight (as measured through GPC) of from 300 to 2000. Those having a molecular weight of smaller than 300 and those having a molecular weight of larger than 2000 are both unfavorable as the base oil to be in refrigerator oil, since the kinematic viscosity of the former is too small and since the latter are waxy.

The polyesters mentioned hereinabove are described in detail in International Patent Application Laid-Open No. WO91/07479, and those described therein are all employable in the present invention.

As the polyol ester ④, employable herein are carboxylates of polyhydroxy compounds having at least 2 hydroxyl groups, which may be represented, for example, by the following general formula (XV):

wherein $R^{46}$ represents a hydrocarbon group; $R^{47}$ represents a hydrogen atom, or a hydrocarbon group having from 1 to 22 carbon atoms; f represents an integer of from 2 to 6; and plural—$OCOR^{47}$s may be the same or different.

In formula (XV), $R^{46}$ is a hydrocarbon group, which may be linear or branched and is preferably an alkyl group having from 2 to 10 carbon atoms. $R^{47}$ is a hydrogen atom, or a hydrocarbon group having from 1 to 22 carbon atoms, and is preferably an alkyl group having from 2 to 16 carbon atoms.

The polyol esters of formula (XV) can be obtained by reacting a polyalcohol of a general formula (XVI):

wherein $R^{46}$ and f have the same meanings as above, and a carboxylic acid of a general formula (XVII):

wherein $R^{47}$ has the same meaning as above,
or its reactive derivative, such as its ester or acid halide.

The polyalcohol of formula (XVI) may include, for example, ethylene glycol, propylene glycol, butylene glycol, neopentyl glycol, trimethylolethane, trimethylolpropane, glycerin, pentaerythritol, dipentaerythritol, and sorbitol. The carboxylic acid of formula (XVII) may include, for example, propionic acid, butyric acid, pivalic acid, valeric acid, caproic acid, heptanoic acid, 3-methylhexanoic acid, 2-ethylhexylic acid, caprylic acid, decanoic acid, lauryl acid, myristic acid, and palmitic acid.

The carbonate derivative ⑤ may include, for example, polycarbonates of a general formula (XVIII)

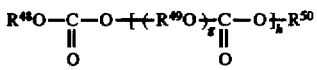

wherein $R^{48}$ and $R^{50}$ each represent a hydrocarbon group having 30 or less carbon atoms, or an ether bond-having hydrocarbon group having from 2 to 30 carbon atoms, and these may be the same or different; $R^{49}$ represents an alkylene group having from 2 to 24 carbon atoms; g represents an integer of from 1 to 100; and h represents an integer of from 1 to 10.

In formula (XVIII), $R^{48}$ and $R^{50}$ each are a hydrocarbon group having 30 or less carbon atoms, or an ether bond-having hydrocarbon group having from 2 to 30 carbon atoms. Specific examples of the hydrocarbon group having 30 or less carbon atoms may include aliphatic hydrocarbon groups such as a methyl group, an ethyl group, an n-propyl group, an isopropyl group, various butyl groups, various pentyl groups, various hexyl groups, various heptyl groups, various octyl groups, various nonyl groups, various decyl groups, various undecyl groups, various dodecyl groups, various tridecyl groups, various tetradecyl groups, various pentadecyl groups, various hexadecyl groups, various heptadecyl groups, various octadecyl groups, various nonadecyl groups, and various eicosyl groups; alicyclic hydrocarbon groups such as a cyclohexyl group, a 1-cyclohexenyl group, a mehtylcyclohexyl group, a dimethylcyclohexyl group, a decahydronaphthyl group, and a tricyclodecanyl group; aromatic hydrocarbon groups such as a phenyl group, various tolyl groups, various xylyl groups, a mesityl group, and various naphthyl groups; and aroaliphatic hydrocarbon groups such as a benzyl group, a methylbenzyl group, a phenylethyl group, a 1-methyl-1-phenylethyl group, a styryl group, and a cinnamyl group.

The ether bond-having hydrocarbon group having from 2 to 30 carbon atoms may be, for example, a glycol ether group of a general formula (XIX):

wherein $R^{51}$ represents an alkylene group having 2 or 3 carbon atoms (e.g., ethylene, propylene, or trimethylene); $R^{52}$ represents an aliphatic, alicyclic or aromatic hydrocarbon group having 28 or less carbon atoms (e.g., selected from those referred to hereinabove for $R^{48}$ and $R^{50}$); and i represents an integer of from 1 to 20, and may include, for example, an ethylene glycol monomethyl ether group, an ethylene glycol monobutyl ether group, a diethylene glycol mono-n-butyl ether group, a triethylene glycol monoethyl ether group, a propylene glycol monomethyl ether group, a propylene glycol monobutyl ether group, a dipropylene glycol monoethyl ether group, and a tripropylene glycol mono-n-butyl ether group.

As the hydrocarbon groups for $R^{48}$, $R^{50}$ and $R^{52}$, preferred are alkyl groups, such an n-butyl group, an isobutyl group, an isoamyl group, a cyclohexyl group, an isoheptyl group, a 3-methylhexyl group, a 1,3-dimethylbutyl group, a hexyl group, an octyl group, and a 2-ethylhexyl group.

As the ether bond-having hydrocarbon groups for $R^{48}$ and $R^{50}$, preferred are alkylene glycol monoalkyl ether groups such as an ethylene glycol monomethyl ether group, an ethylene glycol monobutyl ether group, a diethylene glycol monomethyl ether group, a triethylene glycol monomethyl ether group, a propylene glycol monomethyl ether group, a propylene glycol monobutyl ether group, a dipropylene glycol monoethyl ether group, and a tripropylene glycol mono-n-butyl ether group.

In formula (XVIII), $R^{49}$ is an alkylene group having from 2 to 24 carbon atoms, which may include, for example, an ethylene group, a propylene group, a butylene group, an amylene group, a methylamylene group, an ethylamylene group, a hexylene group, a methylhexylene group, an ethylhexylene group, an octamethylene group, a nonamethylene group, a decamethylene group, a dodecamethylene group, and a tetradecamethylene group. In plural $R^{49}$Os, if any, plural $R^{49}$s may be the same or different.

The polycarbonates of formula (XVIII) preferably have a molecular weight (weight-average molecular weight) of from 300 to 3000, preferably from 400 to 1500. Those having a molecular weight of smaller than 300 and those having a molecular weight of larger than 3000 are both unsuitable as lubricating oil, since the kinematic viscosity of the former is too small and since the latter are waxy.

The polycarbonates can be produced by various methods, but, in general, they are produced from dicarbonates or carbonate-forming derivatives, such as phosgene, and aliphatic dialcohols.

To produce the polycarbonates, using such starting compounds, employable are any ordinary methods for producing polycarbonates, but, in general, employed is any of interesterification or phosgenation.

The polycarbonates mentioned hereinabove are described in detail in Japanese Patent Application Laid-Open No. 3-217495, and those described therein are all employable herein.

As the carbonate derivative, also employable herein are glycol ether carbonates of a general formula (XX):

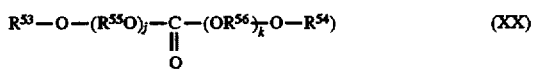

wherein $R^{53}$ and $R^{54}$ each represent an aliphatic, alicyclic, aromatic or aroaliphatic hydrocarbon group having from 1 to 20 carbon atoms, and these may be the same or different; $R^{55}$ and $R^{56}$ each represent an ethylene group or an isopropylene group, and these may be the same or different; and j and k each represent an integer of from 1 to 100.

In formula (XX), specific examples of the aliphatic hydrocarbon group for $R^{53}$ and $R^{54}$ may include a methyl group, an ethyl group, an n-propyl group, an isopropyl group, various butyl groups, various pentyl groups, various hexyl groups, various heptyl groups, various octyl groups, various nonyl groups, various decyl groups, various undecyl groups, various dodecyl groups, various tridecyl groups, various tetradecyl groups, various pentadecyl groups, various hexadecyl groups, various heptadecyl groups, various octadecyl groups, various nonadecyl groups, and various eicosyl groups. Specific examples of the alicyclic hydrocarbon group may include a cyclohexyl group, a 1-cyclohexenyl group, a methylcyclohexyl group, a dimethylcyclohexyl group, a decahydronaphthyl group, and a tricyclodecanyl group. Specific examples of the aromatic hydrocarbon group may include a phenyl group, various tolyl groups, various xylyl groups, a mesityl group, and various naphthyl groups. Specific examples of the aroaliphatic hydrocarbon group may include a benzyl group, a methylbenzyl group, a phenylethyl group, a styryl group, and a cinnamyl group.

The glycol ether carbonates of formula (XX) can be produced, for example, by interesterifying a polyalkylene glycol monoalkyl ether in the presence of an excess amount of an alcohol carbonate having a relatively low boiling point.

The glycol ether carbonates mentioned hereinabove are described in detail in Japanese Patent Application Laid-Open No. 3-149295, and those described therein are all employable herein.

As the carbonate derivative, further employable herein are carbonates of a general formula (XXI):

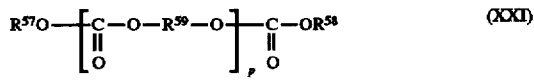

wherein $R^{57}$ and $R^{58}$ each represent an alkyl group having from 1 to 15 carbon atoms, or a dialcohol residue having from 2 to 12 carbon atoms, and these may be the same or different; $R^{59}$ represents an alkylene group having from 2 to 12 carbon atoms; and p represents an integer of from 0 to 30.

In formula (XXI), $R^{57}$ and $R^{58}$ each are an alkyl group having from 1 to 15 carbon atoms, preferably from 2 to 9 carbon atoms, or a dialcohol residue having from 2 to 12 carbon atoms, preferably from 2 to 9 carbon atoms; $R^{59}$ is an alkylene group having from 2 to 12 carbon atoms, preferably from 2 to 9 carbon atoms; and p is an integer of from 0 to 30, preferably from 1 to 30. Other carbonates not satisfying the above-mentioned conditions are unfavorable, since their properties, such as miscibility with Flon refrigerants, are poor. The alkyl group having from 1 to 15 carbon atoms for $R^{57}$ and $R^{58}$ may include, for example, a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an isopropyl group, an isobutyl group, a tert-butyl group, an isopentyl group, an isohexyl group, an isoheptyl group, an isooctyl group, an isononyl group, an isodecyl group, an isoundecyl group, an isododecyl group, an isotridecyl group, an isotetradecyl group, and an isopentadecyl group.

The dialcohol residue having from 2 to 12 carbon atoms may be, for example, a residue of ethylene glycol, 1,3-propanediol, propylene glycol, 1,4-butanediol, 1,2-butanediol, 8-methyl-1,3-propanediol, 1,5-pentanediol, neopentylene glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol or 1,12-dodecanediol.

The alkylene group having from 2 to 12 carbon atoms to be represented by $R^{59}$ may have a linear or branched structure, including, for example, an ethylene group, a trimethylene group, a propylene group, a tetramethylene group, a butylene group, a 2-methyltrimethylene group, a pentamethylene group, a 2,2-dimethyltrimethylene group, a hexamethylene group, a 2-ethyl-2-methyltrimethylene group, a heptamethylene group, a 2-methyl-2-propyltrimethylene group, a 2,2-diethyltrimethylene group, an octamethylene group, a nonamethylene group, a decamethylene group, an undecamethylene group, and a dodecamethylene group.

The molecular weight of the above-mentioned carbonates is not specifically defined, but in view of their ability to airhermetically seal compressors, the number-average molecular weight thereof is preferably from 200 to 3000, more preferably from 300 to 2000.

The carbonates mentioned hereinabove are described in detail in Japanese Patent Application Laid-Open No. 4-63893, and those described therein are all employable herein.

The polyether ketone ⑥ may include, for example, compounds of a general formula (XXII):

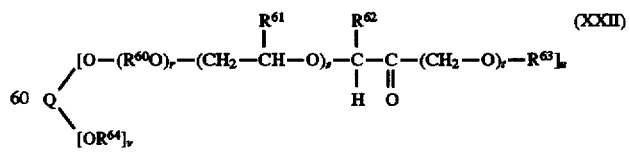

wherein Q represents a mono- to octa-alcohol residue; $R^{60}$ represents an alkylene group having from 2 to 4 carbon atoms; $R^{61}$ represents a methyl group or an ethyl group; $R^{62}$ and $R^{64}$ each represent a hydrogen atom, or an aliphatic, aromatic or aroaliphatic hydrocarbon group having 20 or less carbon atoms, and these may be the same or different; $R^{63}$ represents an aliphatic, aromatic or aroaliphatic hydrocarbon residue having 20 or less carbon atoms; r and s each represent a number of from 0 to 30; u represents a number of from 1 to 8; v represents a number of from 0 to 7, provided that (u+v) falls between 1 and 8; and t represents 0 or 1.

In formula (XXII), Q is a mono- to octa-alcohol residue. The alcohol to give the residue Q may include monoalcohols, for example, aliphatic monoalcohols such as methyl alcohol, ethyl alcohol, linear or branched propyl alcohol, linear or branched butyl alcohol, linear or branched pentyl alcohol, linear or branched hexyl alcohol, linear or branched heptyl alcohol, linear or branched octyl alcohol, linear or branched nonyl alcohol, linear or branched decyl alcohol, linear or branched undecyl alcohol, linear or branched dodecyl alcohol, linear or branched tridecyl alcohol, linear or branched tetradecyl alcohol, linear or branched pentadecyl alcohol, linear or branched hexadecyl alcohol, linear or branched heptadecyl alcohol, linear or branched octadecyl alcohol, linear or branched nonadecyl alcohol, and linear or branched eicosyl alcohol; aromatic alcohols such as phenol, methylphenol, nonylphenol, octylphenol, and naphthol; aroaliphatic alcohols such as benzyl alcohol, and phenylethyl alcohol; and partially-etherified derivatives of these; dialcohols, for example, linear or branched aliphatic alcohols such as ethylene glycol, propylene glycol, butylene glycol, neopentylene glycol, and tetramethylene glycol; aromatic alcohols such as catechol, resorcinol, bisphenol A, and bisphenyldiol; and partially-etherified derivatives of these; trialcohols, for example, linear or branched aliphatic alcohols such as glycerin, trimethylolpropane, trimethylolethane, trimethylolbutane, and 1,3,5-pentanetriol; aromatic alcohols such as pyrogallol, methylpyrogallol, and 5-sec-butylpyrogallol; and partially-etherified derivatives of these; and tetra- to octa-alcohols, for example aliphatic alcohols such as pentaerythritol, diglycerin, sorbitan, triglycerin, sorbitol, dipentaerythritol, tetraglycerin, pentaglycerin, hexaglycerin, and tripentaerythritol; and partially-etherified derivatives of these.

In formula (XXII), the alkylene group having from 2 to 4 carbon atoms to be represented by $R^{60}$ may be linear or branched, including, for example, an ethylene group, a propylene group, an ethylethylene group, a 1,1-dimethylethylene group, and a 1,2-dimethylethylene group. The aliphatic, aromatic or aroaliphatic hydrocarbon group having 20 or less carbon atoms to be represented by $R^{62}$ to $R^{64}$ may include, for example, linear alkyl groups such as a methyl group, an ethyl group, a propyl group, a butyl group, a pentyl group, a heptyl group, an octyl group, a nonyl group, a decyl group, an undecyl group, a lauryl group, a myristyl group, a palmityl group, and a stearyl group; branched alkyl groups such as an isopropyl group, an isobutyl group, an isoamyl group, a 2-ethylhexyl group, an isostearyl group, and a 2-heptylundecyl group; aryl groups such as a phenyl group and a methylphenyl group; and arylalkyl groups such as a benzyl group.

In formula (XXII), r and s each are a number of from 0 to 30. If r and s each are larger than 30, the ether groups in the molecule participate too much in the behavior of the molecule, resulting in that the compounds having such many ether groups are unfavorable in view of their poor miscibility with Flon refrigerants, their poor electric insulating properties and their high hygroscopicity. u is a number of from 1 to 8, v is a number of from 0 to 7, and (u+v) shall fall between 1 and 8. These numbers are mean values and are therefore not limited to only integers. t is 0 or 1. $R^{60}$s of a number of (r×u) may be the same or different; and $R^{61}$s of a number of (s×u) may also be the same or different. Where u is 2 or more, r's, s's, t's, $R^{62}$s and $R^{63}$s of the number of u each may be the same or different. Where v is 2 or more, $R^{64}$s of the number of v may be the same or different.

To produce the polyether ketones of formula (XXII), employable are any known methods. For example, employable is a method of oxidizing a secondary alkyloxyalcohol with a hypochlorite and acetic acid (see Japanese Patent Application Laid-Open No. 4-126716); or a method of oxidizing said alcohol with zirconium hydroxide and a ketone (see Japanese Patent Application Laid-Open No. 3-167149).

The fluorinated oil ⑦ may include, for example, fluorosilicone oils, perfluoropolyethers, and reaction products of alkanes and perfluoroalkyl vinyl ethers. As examples of the reaction products of alkanes and perfluoroalkyl vinyl ethers, mentioned are compounds of a general formula (XXV):

wherein w represents an integer of from 1 to 4; N represents an integer of from 6 to 20; and M represents an integer of from 1 to 4, which are obtained by reacting an alkane of a general formula (XXIII):

wherein N has the same meaning as above, and a perfluoroalkyl vinyl ether of a general formula (XXIV):

wherein M has the same meaning as above.

The alkane of formula (XXIII) may be linear, branched or cyclic, including, for example, n-octane, n-decane, n-dodecane, cyclooctane, cyclododecane, and 2,2,4-trimethylpentane. Specific examples of the perfluoroalkyl vinyl ether of formula (XXIV) may include perfluoromethyl vinyl ether, perfluoroethyl vinyl ether, perfluoro-n-propyl vinyl ether, and perfluoro-n-butyl vinyl ether.

On the other hand, hydrocarbon-type synthetic oils which are also employable in the present invention may include, for example, olefinic polymers such as poly-a-olefins; as well as alkylbenzenes and alkylnaphthalenes.

The refrigerator oil composition of the present invention may comprise, as the base oil, one or more of the above-mentioned mineral oils either singly or as combined, or one or more of the above-mentioned synthetic oils either singly or as combined, or even one or more such mineral oils and one or more such synthetic oils as combined. Of these, especially preferred are oxygen-containing organic compounds, as being well miscible with Flon refrigerants such as R-134a and having good lubricating properties.

The refrigerator oil composition of the present invention comprises, in addition to said base oil, at least one polyether compound having a kinematic viscosity of from 200 to 10000 mm²/sec at 100° C.

Polyether compounds for use in the present invention have 50 or more, preferably 100 or more oxyalkylene groups or vinyl ether groups in one molecule, and must have a kinematic viscosity of from 200 to 10000 mm²/sec at 100° C. Preferably, their kinematic viscosity falls between 300 and 10000 mm²/sec, more preferably between 500 and 9000 mm²/sec. In general, their kinematic viscosity is higher than that of the base oil by from about 200 to about 9000 mm²/sec. These polyether compounds have a number average molecular weight of generally from 4500 to 1000000, preferably from 6000 to 1000000, more preferably from 8000 to 900000.

Concretely, said polyether compounds include, for example, (A) polyalkylene glycols, (B) polyvinyl ethers, (C) carbonate derivatives, and (D) polyether ketones.

The constitutive units including the terminal structures, which constitute the above-mentioned polyether compounds (A) to (D) may be the same as those referred to for the above-mentioned base oils ①, ②, ⑤, ⑥. These polyether compounds differ from said base oils only in the kinematic viscosity and the molecular weight.

The refrigerator oil composition of the present invention may comprise one or more of the above-mentioned polyether compounds either singly or as combined. The amount of said polyether compound in the composition is preferably from 0.01 to 10% by weight relative to the total weight of the composition. If its amount is less than 0.01% by weight, the compound could not sufficiently exhibit its ability to improve the lubricating property of the composition. On the other hand, even if the amount of the derivative is more than 10% by weight, the effect of the compound is not enhanced so much relative to its amount, but rather the solubility of the compound in the base will be undesirably lowered. In view of the effect of the compound to improve the lubricating property of the composition and of the solubility thereof, the amount of the compound to be in the composition may be more preferably from 0.1 to 8% by weight, even more preferably from 0.3 to 6% by weight.

The refrigerator oil composition of the present invention may optionally contain a dissolution aid. As the dissolution aid, employable is any of monoalcohols, glycols, polyalcohols and clathrate compounds. The monoalcohols may include, for example, lauryl alcohol, palmityl alcohol, and oleyl alcohol; the glycols may include, for example, alkylene glycols such as ethylene glycol, and propylene glycol; polyalkylene glycols such as diethylene glycol, and triethylene glycol; ether derivatives of polyalkylene glycols, such as butyl cellosolve; and neopentylene glycol. The polyalcohols may include, for example, glycerin, sorbitol, trimethylolpropane, and pentaerythritol. The clathrate compounds may include, for example, crown ethers, cryptands, and calyx arenes. These dissolution aids may be used either singly or as combined. The amount of the dissolution aid to be in the oil composition may be generally 30% by weight or smaller, preferably from 0.1 to 15% by weight, relative to the total weight of the composition.

The refrigerator oil composition of the present invention may further contain, if desired, various known additives, for example, extreme pressure agents such as phosphates and phosphites; antioxidants such as phenolic compounds and amine compounds; stabilizers such as epoxy compounds, e.g., phenyl glycidyl ether, cyclohexane-oxide, epoxidated soybean oil; copper-inactivating agents such as benzotriazole, and benzotriazole derivatives; and defoaming agents such as silicone oils, and fluorosilicone oils.

The refrigerants to be used in refrigerators to which the refrigerator oil composition of the present invention is applied are preferably hydrogen-containing Flon compounds such as hydrofluorocarbons and hydrochlorofluorocarbons. For these, for example, concretely mentioned are 1,1,1,2-tetrafluoroethane (R134a), chlorodifluoromethane (R22), a mixture of chlorodifluoroethane and 1-chloro-1,1,2,2,2-pentafluoroethane (R502), 1,1-difluoroethane (R152a), pentafluoroethane (R125), 1,1,1-trifluoroethane (R143a), difluoroethane (R32), trifluoromethane (R23), 1,3-dichloro-1,1,2,2,3-pentafluoropropane (R225cb), 3,3-dichloro-1,1,1,2,2-pentafluoropropane (R225ca), 1,1-dichloro-1-fluoroethane (R141b), 1,1-dichloro-2,2,2-trifluoroethane (R123), 1-chloro-1,1-difluoroethane (R142b), and 2-chloro-1,1,1,2-tetrafluoroethane (R124). Of these, especially preferred are hydrofluorocarbons such as R134a and others.

Also employable as refrigerants are other fluorine compounds such as tetrafluoromethane (R14), hexafluoroethane (R116), and octafluoropropane (R218); as well as ammonia; hydrocarbon compounds such as propane, cyclopropane, butane, isobutane, and pentane; ether compounds such as dimethyl ether, and methyl ethyl ether; and fluorinated ether compounds such as monofluorodimethyl ether, difluorodimethyl ether, trifluorodimethyl ether, tetrafluorodimethyl ether, pentafluorodimethyl ether, hexafluorodimethyl ether, heptafluoro-n-propyl methyl ether, heptafluoroisopropyl methyl ether, pentafluoroethyl methyl ether, and trifluoromethoxy-1,1,2,2-tetrafluoroethane.

In what follows, the present invention will be described in more detail by referring to Examples, which, however, are not intended to limit the invention thereto.

EXAMPLES 1 TO 18, REFERENCE EXAMPLES 1 AND 2, AND COMPARATIVE EXAMPLES 1 AND 2

To the base oil shown in Table 1 below, added was the additive shown in Table 1 in the amount also shown in Table 1, said amount being relative to the total weight of each composition, to prepare various refrigerator oil compositions. The compositions were subjected to a fatigue life test, a laboratory model test, a seizure test, an abrasion test and a sealed tube test each in the manner mentioned below. From the data obtained, the properties of the compositions were evaluated. The results obtained are shown in Table 1.

(1) Seizure Test

Used herein was a Falex tester with a pin/block combination of A4032/AISI-C-1137. The pin/block combination was set on the tester, and each oil sample was applied to the pin in an amount of 4 μL. The tester was conditioned to have an atmosphere of R134a, and then run at room temperature under a load of 50 Lbs, at a rotating speed of 1200 rpm, whereupon the time as spent before seizure (seizure time) was measured.

(2) Fatigue Life Test

A fatigue life tester was used herein. A thrust bearing, for which each oil sample was tested, was mounted onto the tester. 100 g of an oil sample was charged into the tester, which was run at an oil temperature of 80° C. under a load of 550 kg, at a rotating speed of 1800 rpm, while R134A was being introduced thereinto at a flow rate of 0.5 liters/hr, and the fatigue life of the sample was measured.

For each of Examples, Reference Examples and Comparative Example, 10 thrust bearings were subjected to the seizure test. In this test, the number of revolutions at which a half of the thrust bearings tested for each sample oil were fatigued and broken ($L_{50}$—this indicates the fatigue life for the sample oil tested) was counted. The data obtained are shown in Table 1.

(3) Laboratory Model Test

A bench tester, which is a laboratory model of actual refrigerator systems, was used herein for a low-speed high-load test (jetting pressure of 30 kgf/cm$^2$G; number of revolutions of 1000 rpm; amount of sample oil of 150 g; amount of R134a of 1000 g), in which the presence or absence of pitching was checked.

(4) Sealed Tube Test

A catalyst (iron, copper and aluminium wires of 1.5 mm in diameter and 4 cm in length) was put into a glass tube, to which were added R134a/oil sample/air in a ratio of 1 g/4 ml/40 torr, and the tube was sealed. After having been stored therein at 175° C. for 10 days, the appearance of the oil sample and that of the catalyst were observed, the increase in the total acid value of the oil sample was obtained, and the presence or absence of sludge in the tube was checked.

The total acid value was obtained before and after the test, in accordance with JIS K2501, and the increment was obtained and shown in Table 1 below. In Table 1, "good" for the outward appearance of the oil sample and that of the catalyst means that the outward appearance of these did not change before and after the test.

TABLE 1

| | Base Oil | Additive Compound | Additive Amount Added (wt %) | Fatigue Life $L_{50}$ (rev) |
|---|---|---|---|---|
| Example 1 | 1 | A | 0.5 | $13 \times 10^6$ |
| Example 2 | 1 | A | 1.5 | $14 \times 10^6$ |
| Example 3 | 1 | A | 5.0 | $16 \times 10^6$ |
| Example 4 | 2 | A | 1.5 | $14 \times 10^6$ |
| Example 5 | 3 | A | 1.5 | $13 \times 10^6$ |
| Example 6 | 4 | A | 1.5 | $12 \times 10^6$ |
| Example 7 | 5 | A | 1.5 | $10 \times 10^6$ |
| Example 8 | 6 | A | 1.5 | $10 \times 10^6$ |
| Example 9 | 7 | A | 1.5 | $13 \times 10^6$ |
| Example 10 | 4 | B | 1.5 | $13 \times 10^6$ |
| Example 11 | 4 | C | 1.5 | $10 \times 10^6$ |
| Example 12 | 1 | D | 1.5 | $8 \times 10^6$ |
| Example 13 | 1 | E | 5.0 | $16 \times 10^6$ |
| Example 14 | 1 | F | 1.5 | $12 \times 10^6$ |
| Example 15 | 2 | G | 1.5 | $10 \times 10^6$ |
| Example 16 | 3 | H | 1.5 | $10 \times 10^6$ |
| Example 17 | 4 | I | 1.5 | $13 \times 10^6$ |
| Example 18 | 5 | A | 1.5 | $9 \times 10^6$ |
| Reference Example 1 | 6 | — | — | $3 \times 10^6$ |
| Reference Example 2 | 7 | — | — | $4 \times 10^6$ |
| Comparative Example 1 | 4 | J | 1.5 | $4 \times 10^6$ |

| | Laboratory Model Test Pitching | Seizure Test Seizure Time (sec) | Sealed Tube Test Appearance of Oil | Sealed Tube Test Appearance of Catalyst | Sealed Tube Test Total Acid Value(*) | Sealed Tube Test Sludge |
|---|---|---|---|---|---|---|
| Example 1 | — | 120 | Good | Good | 0.1> | No |
| Example 2 | No | 250 | Good | Good | 0.1> | No |
| Example 3 | No | 350 | Good | Good | 0.1> | No |
| Example 4 | No | 240 | Good | Good | 0.1> | No |
| Example 5 | No | 200 | Good | Good | 0.1> | No |
| Example 6 | No | 150 | Good | Good | 0.1> | No |
| Example 7 | — | 110 | Good | Good | 2.6 | No |
| Example 8 | — | 100 | Good | Good | 0.1> | No |
| Example 9 | No | 180 | Good | Good | 0.1> | No |
| Example 10 | No | 130 | Good | Good | 0.1> | No |
| Example 11 | — | 90 | Good | Good | 0.1> | No |
| Example 12 | — | 90 | Good | Good | 0.1> | No |
| Example 13 | No | 320 | Good | Good | 0.1> | No |
| Example 14 | No | 120 | Good | Good | 0.1> | No |
| Example 15 | — | 90 | Good | Good | 2.3 | No |
| Example 16 | — | 90 | Good | Good | 0.1> | No |
| Example 17 | No | 130 | Good | Good | 0.1> | No |
| Example 18 | — | 90 | Good | Good | 4.5 | No |
| Reference Example 1 | Yes | 30 | Good | Good | 0.1> | No |
| Reference Example 2 | Yes | 20 | Good | Good | 0.1> | No |
| Comparative Example 1 | Yes | 40 | Good | Good | 0.1> | No |

(*)Increase in total acid value of oil. Unit of acid value is mgKOH/g.

[Notes]
Base oil:
1: Polyoxypropylene glycol dimethyl ether, having a kinematic viscosity of 9.3 mm$^2$/sec (at 100° C.) and a molecular weight of 1150.
2: Polyoxyethylene polyoxypropylene glycol dimethyl ether, having a kinematic viscosity of 20.5 mm$^2$/sec (at 100° C.) and a molecular weight of 1590.
3: Polyoxypropylene glycol monoethyl ether, having a kinematic viscosity of 10.5 mm$^2$/sec (at 100° C.) and a molecular weight of 1000.
4: Polyoxypropylene glycol monobutyl ether, having a kinematic viscosity of 10.8 mm$^2$/sec (at 100° C.) and a molecular weight of 1000. This is a commercial product having a trade name of Unilube MB11.
5. Polyoxypropylene glycol diacetate, having a kinematic viscosity of 10.2 mm$^2$/sec (at 100° C.) and a molecular weight of 980.

TABLE 1-continued

6. Polyoxypropylene glycol dimethylcarbonate, having a kinematic viscosity of 9.6 mm²/sec (at 100° C.) and a molecular weight of 850.
7: Polyvinyl ethyl ether/polyvinyl butyl ether copolymer, having a kinematic viscosity of 7.8 mm²/sec (at 100° C.) and a molecular weight of 900.
8: Hindered ester, having a kinematic viscosity of 10.2 mm²/s (at 100° C.). This is a commercial product having a trade name of EMKARATE RL68SE (produced by ICI).
Additive:
A: Polyoxyethylene-polyoxypropylene glycol dimethyl ether, having a kinematic viscosity of 700 mm²/sec (at 100° C.) and a molecular weight of 8950.
B: Polyoxyethylene-polyoxypropylene glycol dimethyl ether, having a kinematic viscosity of 3000 mm²/sec (at 100° C.) and a molecular weight of 14500.
C: Polyoxyethylene-polyoxypropylene glycol dimethyl ether, having a kinematic viscosity of 350 mm²/sec (at 100° C.) and a molecular weight of 6300.
D: Polyoxyethylene-polyoxypropylene glycol dimethyl ether, having a kinematic viscosity of 250 mm²/sec (at 100° C.) and a molecular weight of 5800.
E: Polyoxypropylene glycol dimethyl ether, having a kinematic viscosity of 500 mm²/sec (at 100° C.) and a molecular weight of 7700.
F: Polyoxypropylene glycol monobutyl ether, having a kinematic viscosity of 1000 mm²/sec (at 100° C.) and a molecular weight of 10500.
G: Polyoxypropylene glycol diacetate, having a kinematic viscosity of 500 mm²/sec (at 100° C.) and a molecular weight of 7500.
H: Polyoxypropylene glycol dimethylcarbonate, having a kinematic viscosity of 500 mm²/sec (at 100° C.) and a molecular weight of 7400.
I: Polyvinyl ethyl ether/polyvinyl butyl ether copolymer, having a kinematic viscosity of 500 mm²/sec (at 100° C.) and a molecular weight of 4500.
J: polyoxyethylene-polyoxypropylene glycol dimethyl ether, having a kinematic viscosity of 30 mm²/sec (at 100° C.) and a molecular weight of 2200.

As in Table 1 above, it is known that the samples of the refrigerator oil composition of the present invention all had a long fatigue life without causing pitching, and had a long seizure time. In addition, in the sealed tube test, the samples of the composition of the present invention all gave good results. As opposed to these, the samples of Reference Examples 1 and 2, to which no additive was added, and the sample of Comparative Example 1, to which was added a polyether compound having a lower kinematic viscosity than the base oil therein, had a short fatigue life with causing pitching, and had a short seizure time.

INDUSTRIAL APPLICABILITY

The refrigerator oil composition of the present invention has an excellent lubricating property, while specifically improving the lubricity of bearings. This is effective for preventing bearings from being seized and fatigued, and is suitable as a lubricating oil in refrigerators using hydrogen-containing Flon refrigerants, such as R134a, that do not cause environmental pollution.

Accordingly, the refrigerator oil composition of the present invention is especially effectively used in car air-conditioners, room air-conditioners, electric refrigerators, etc., and its value in industrial use is extremely high.

We claim:

1. A refrigerator oil composition comprising:
   i) at least one base oil selected from the group consisting of mineral oils, synthetic oils and a mixture thereof, having a kinematic viscosity of from 1 to 100 mm²/sec at 100° C.; and
   ii) 0.01 to 10% by weight relative to the total weight of said composition of at least one polyether compound having a kinematic viscosity of from 200 to 10,000 mm²/sec at 100° C.

2. The refrigerator oil composition according to claim 1, wherein the base oil comprises one or more selected from polyalkylene glycols, polyvinyl ethers, polyesters, polyol esters, carbonate derivatives, polyether ketones, and fluorinated oils.

3. The refrigerator oil Composition according to claim 1, wherein the polyether compound is at least one selected from polyalkylene glycols, polyvinyl ethers, carbonate derivatives, and polyether ketones.

4. The refrigerator oil composition of claim 1, wherein said at least one polyether compound has a kinematic viscosity of between 300 and 10,000 mm²/sec at 100° C.

5. The refrigerator oil composition of claim 1, wherein said at least one polyether compound has a kinematic viscosity of between 500 and 9,000 mm²/sec at 100° C.

6. The refrigerator oil composition of claim 1, wherein said at least one polyether compound has a kinematic viscosity which is higher than said kinematic viscosity of said base oil by from 200 to 9,000 mm²/sec at 100° C.

7. A refrigerant composition comprising:
   a) a refrigerant; and
   b) a refrigerator oil composition comprising:
      i) at least one base oil selected from the group consisting of mineral oils, synthetic oils and a mixture thereof, having a kinematic viscosity of from 1 to 100 mm²/sec at 100° C.; and
      ii) 0.01 to 10% by weight relative to the total weight of said composition of at least one polyether compound having a kinematic viscosity of from 200 to 10,000 mm²/sec at 100° C.

8. The refrigerant composition of claim 7, wherein said refrigerant is selected from the group consisting of hydrofluorocarbons and hydrochlorofluorocarbons.

9. The refrigerant composition of claim 7, wherein said refrigerant is selected from the group consisting of 1,1,1,2-tetrafluoroethane, chlorodifluoromethane, a mixture of chlorodifluoroethane and 1-chloro-1,1,2,2,2-pentafluoroethane, 1,1 -difluoroethane, pentafluoroethane, 1,1,1 -trifluoroethane, difluoroethane, trifluoromethane, 1,3 -dichloro-1,1,2,2,3-pentafluoropropane, 3,3 -dichloro-1,1,1, 2,2-pentafluoropropane, 1,1 -dichloro-1-fluoroethane, 1,1 -dichloro-2,2,2-trifluoroethane, 1-chloro-1,1-difluoroethane, and 2-chloro-1,1,1,2-tetrafluoroethane.

* * * * *

UNITED STATES PATENT AND TRADEMARK OFFICE
CERTIFICATE OF CORRECTION

PATENT NO. : 5,801,132
DATED : September 1, 1998
INVENTOR(S) : Masato KANEKO, et al.

It is certified that error appears in the above-identified patent and that said Letters Patent is hereby corrected as shown below:

On the title page, Item [30], the Foreign Application Priority Data, is missing. It should be:

--Apr. 26, 1996 [JP] Japan...........8-107634--

Signed and Sealed this

Fourth Day of May, 1999

Attest:

Attesting Officer

Q. TODD DICKINSON

Acting Commissioner of Patents and Trademarks